United States Patent
Cai et al.

(10) Patent No.: US 7,291,677 B2
(45) Date of Patent: Nov. 6, 2007

(54) ADHERENT, MODIFIED THERMOPLASTIC ELASTOMERIC BLENDS, ARTICLES, AND METHODS

(75) Inventors: Kevin Cai, Arlington, TX (US); Anthony Nguyen, Arlington, TX (US); Charles G. Reid, Southlake, TX (US)

(73) Assignee: Solvay Engineered Polymers, Inc., Mansfield, TX (US)

( * ) Notice: Subject to any disclaimer, the term of this patent is extended or adjusted under 35 U.S.C. 154(b) by 267 days.

(21) Appl. No.: 10/877,976

(22) Filed: Jun. 29, 2004

(65) Prior Publication Data

US 2005/0131154 A1 Jun. 16, 2005

Related U.S. Application Data

(60) Provisional application No. 60/529,099, filed on Dec. 15, 2003.

(51) Int. Cl.
*C08F 8/00* (2006.01)
*C08L 35/00* (2006.01)
*C08L 9/00* (2006.01)
*C08L 23/00* (2006.01)
*C08L 23/04* (2006.01)

(52) U.S. Cl. .............. 525/191; 525/193; 525/194; 525/207; 525/232; 525/240

(58) Field of Classification Search ........... 525/191, 525/193, 194, 207, 232, 240
See application file for complete search history.

(56) References Cited

U.S. PATENT DOCUMENTS

| | | | |
|---|---|---|---|
| 3,037,954 A | 6/1962 | Gessler et al. | |
| 3,203,937 A | 8/1965 | Breslow et al. | |
| 3,806,558 A | 4/1974 | Fischer et al. | |
| 4,108,947 A | 8/1978 | Kimura et al. | |
| 4,130,535 A | 12/1978 | Coran et al. | |
| 4,311,628 A | 1/1982 | Abdou-Sabet et al. | 524/447 |
| 4,696,986 A | 9/1987 | Halasa et al. | 526/181 |
| 4,948,840 A | 8/1990 | Berta | 525/193 |
| 4,950,541 A | 8/1990 | Tabor et al. | 428/373 |
| 4,957,968 A | 9/1990 | Adur et al. | 525/74 |
| 5,574,105 A | 11/1996 | Venkataswamy | 525/179 |
| 5,650,468 A | 7/1997 | Vandevijver et al. | 524/285 |
| 5,695,838 A | 12/1997 | Tanaka et al. | 428/35 |
| 5,843,577 A | 12/1998 | Ouhadi et al. | 428/474 |
| 5,883,145 A * | 3/1999 | Hurley et al. | 521/144 |
| 5,962,146 A | 10/1999 | Betremieux et al. | 428/476 |
| 6,087,431 A | 7/2000 | Uchida et al. | 524/490 |
| 6,140,434 A | 10/2000 | Halasa et al. | 526/174 |
| 6,201,080 B1 | 3/2001 | Luo et al. | 526/139 |
| 6,207,746 B1 | 3/2001 | Uchida et al. | 525/191 |
| 6,300,418 B1 | 10/2001 | Brzoskowski et al. | 525/191 |
| 6,310,140 B1 | 10/2001 | Raetzsch et al. | 525/191 |
| 6,433,089 B1 | 8/2002 | Nishihara et al. | 525/191 |
| 6,555,624 B2 | 4/2003 | Nishihara et al. | 525/191 |
| 6,602,956 B2 * | 8/2003 | Zhao et al. | 525/191 |
| 6,646,056 B2 | 11/2003 | Zhao et al. | 525/243 |
| 6,797,779 B1 | 9/2004 | Ajbani et al. | 525/191 |
| 6,890,990 B2 * | 5/2005 | Cai et al. | 525/191 |
| 2003/0105232 A1 * | 6/2003 | Zhao et al. | 525/191 |

OTHER PUBLICATIONS

PCT International Search Report mailed May 12, 2005 in International Application No. PCT/US04/39568, filed Nov. 24, 2004.

* cited by examiner

*Primary Examiner*—Nathan M. Nutter
(74) *Attorney, Agent, or Firm*—Haynes and Boone LLP

(57) ABSTRACT

A thermoplastic elastomer that is adherent to polar materials may be made from a dynamically vulcanized blend of propylene resin, ethylene/alpha-olefin/non-conjugated diene elastomers, and a bonding agent via a curing system containing a free radical initiator, at least one co-agent including multifunctional acrylates containing at least two acrylate groups, multifunctional maleimides containing at least two imide groups, or mixtures of both, where the elastomer gel content in the modified blend is at least about 97 percent. Reaction mixtures, articles made therefrom, and methods of dynamically vulcanizing are also disclosed.

25 Claims, No Drawings

ADHERENT, MODIFIED THERMOPLASTIC ELASTOMERIC BLENDS, ARTICLES, AND METHODS

CROSS-REFERENCE TO RELATED APPLICATION

This application claims the benefit of U.S. Provisional Application No. 60/529,099, filed Dec. 15, 2003, now pending, which is incorporated herein in its entirety by express reference thereto.

TECHNICAL FIELD

This invention relates to dynamically vulcanized thermoplastic elastomer compositions cured via a curing system containing a free radical initiator and at least one co-agent and modified by the addition of at least one bonding agent to facilitate adherence to polar materials. Reaction mixtures, articles made therefrom, and methods of dynamically vulcanizing are also included.

BACKGROUND OF THE INVENTION

Thermoplastic elastomers formed from blends of cured rubber and polyolefins are known in the art. The structure of such materials is in the form of a matrix containing a plastic component with discrete domains of a partially or fully cured elastomeric component embedded therein. Olefin-based thermoplastic elastomers, with the structure thus described, have the advantage of being able to undergo plastic flow above the softening point of the polyolefin, and yet behave like a cured elastomer below the softening point. Thus, the materials exhibit thermoplasticity (i.e., flowing at elevated temperature under processing conditions) while also exhibiting rubber-like elasticity (i.e., recovering a substantial amount of deformation when a deforming force is removed).

Dynamic vulcanization is a process whereby the elastomeric portion of the thermoplastic elastomer is cured by heating the blend in the presence of a curative while shearing the blend to form a thermoplastic vulcanizate (TPV). Different curing methods that may be used to partially or fully cure the rubber during dynamic vulcanization include sulfur-, peroxide-, phenolic-, and hydrosilation-based systems.

The extent of cure (i.e., partial or full) of the elastomeric or rubber phase is an important factor in the ultimate properties of the final composite, such that lower oil swell and higher ultimate tensile strength are observed at high states of cure, as taught in U.S. Pat. No. 4,130,535. In other words, a blend containing a fully cured elastomeric phase has improved physical properties as compared to uncured or partially cured blends. Such fully cured vulcanizates are processable as thermoplastics although they are crosslinked to a point where the rubber portions are almost or entirely insoluble in the usual solvents. The processability of a fully cured thermoplastic vulcanizate (TPV) is in direct contrast to thermoset compositions, which retain dimensional integrity at service temperatures of 200° C. or above.

Polar materials, e.g., substrates, are typically either inorganic materials, such as metals, or polymers, such as engineering resins. Commercial olefinic thermoplastic elastomers are generally not easily bonded to polar materials when formed as a multilayer composite in, for example, co-extrusion processes. Usually, the bond is so weak that it delaminates spontaneously or will lose adhesion over a period of time, especially in a moist atmosphere. Various attempts to facilitate adhesion of thermoplastic vulcanizates to polar materials have been attempted in the prior art.

U.S. Pat. No. 4,957,968 relates to an adhesive thermoplastic elastomer composition that includes at least one polyolefin modified by a chemically reactive functional group such as a carboxylic acid or its derivatives including anhydride, acid chloride, isocyanate, oxazoline, epoxide, amine and hydroxide, at least one other polymer prepared from one or more of the following: ethylene, propylene, butylene, isobutylene, octene-1, 4 methyl pentene-1, hexene-1 or mixtures; and at least one partially cured olefinic elastomer, including elastomeric ethylene-propylene copolymers, elastomeric ethylene-propylene terpolymers, polyisoprene, polyisobutylene, ethylene-propylene copolymer rubber, polybutadiene, natural rubber, elastomeric polyesters, polyurethane elastomers, polyamide elastomers and mixtures.

U.S. Pat. No. 5,574,105, for example, describes a thermoplastic elastomer comprising a triblend of an engineering resin, a dynamically vulcanized alloy (DVA) of a thermoplastic olefin polymer and an elastomeric copolymer, and a compatibilizer. The compatibilizer is prepared by melt mixing nylon-6 with polypropylene grafted with 0.1 to 2.0% by weight maleic anhydride. The patent teaches that, without the compatibilizer, blends of engineering resins and DVA have poor mechanical and elongation properties due to the lack of interfacial adhesion between the components, and that, under stress, the weak interfaces may fail and the components delaminate.

U.S. Pat. No. 5,695,838 describes a multilayer laminate body with at least three layers: polyolefin layer, adhesion layer, and polyamide layer. The adhesion layer contains a blend of propylene grafted with an unsaturated carboxylic acid or an anhydride of a dicarboxylic acid and of an ethylene/alpha-olefin copolymer grafted with an unsaturated carboxylic acid.

U.S. Pat. No. 5,843,577 describes the addition of a reaction product of a maleated polypropylene with a polyamide to a dynamically vulcanized thermoplastic elastomer to improve the adhesion of the TPV to an engineering resin such as nylon. The patent further teaches that maleated polypropylene containing about 1.5 wt % of maleic anhydride grafted thereon added to a blend of polypropylene and fully cured EPDM and a common additive with a Durometer Shore A hardness of 45 (Santoprene® 111-45, commercially available from Advanced Elastomer Systems, USA) alone at high level (15 wt %) showed undesirable non-cohesive adhesion performance to polyamide.

U.S. Pat. No. 5,962,146 describes EPDM or EPM rubber coated, without the use of adhesives, with a film containing polyamide and an olefinic material grafted with unsaturated carboxylic acid or an unsaturated dicarboxylic acid or its anhydride.

U.S. Pat. No. 6,300,418 describes a composition containing a polyolefin resin, a rubber such as EPDM or SEBS, and an adhesion promoter in the form of a reaction product of a functionalized rubber and a polyamide. The composition may be at least partially crosslinked.

The prior art addition of polar materials such as engineering resins to the thermoplastic elastomeric blend may not be desirable, however. Physical properties of polar/non-polar blends may be compromised since nylon, for example, is vulnerable to moisture, and non-moisture sensitive TPVs modified with nylon may be damaged from moisture-induced degradation during processing. In addition, adding polyamide to the thermoplastic vulcanizate may adversely affect the morphology and elastic properties of the overall composition, such as increasing compression set. Thus, there remains a need for a thermoplastic elastomeric blend that may be adhered or bonded to a polar substrate without the need for separate adhesion layers, mechanical interlocking, or the addition of undesirable components to either the polar substrate or the thermoplastic vulcanizate composition.

SUMMARY OF THE INVENTION

The invention encompasses an adherent, reactively modified thermoplastic elastomeric blend formed from the dynamic vulcanization of a material including a propylene resin, an ethylene/alpha-olefin/non-conjugated diene copolymeric elastomer component, and a bonding agent, in the presence of a curing system that includes a free radical initiator; and a co-agent including one or more multifunctional acrylates containing at least two acrylate groups, multifunctional maleimides containing at least two imide groups, or mixtures thereof, wherein the free radical initiator and the co-agent are collectively present in an amount sufficient to provide a gel content of the elastomeric blend of at least about 97 percent and to provide blends of the invention that are adherent with a minimum peel strength of at least about 650 g/cm to a polar material.

In one embodiment, the bonding agent includes a propylene homopolymer or copolymer functionalized with a graftable monomer selected from the group consisting of unsaturated monocarboxylic acids, unsaturated dicarboxylic acids, unsaturated monocarboxylic acid anhydrides, unsaturated dicarboxylic anhydrides, and combinations thereof. In a preferred embodiment, the elastomeric blend has an adhesion rating of 1 and a failure type that is cohesive. In another preferred embodiment, the bonding agent includes a maleic anhydride grafted propylene homopolymer or copolymer.

In one embodiment, the free radical initiator is present in an amount of about 0.001 percent to 2 percent by weight of the modified blend. In another embodiment, the co-agent is present in an amount of about 0.1 percent to 10 percent by weight of the modified blend. In a preferred embodiment, the co-agent includes trimethylolpropane triacrylate, ethoxylated trimethylolpropane triacrylate, propoxylated trimethylolpropane triacrylate, propoxylated glyceryl triacrylate, pentaerythritol triacrylate, cyclohexane dimethanol diacrylate, pentaerythritol tetraacrylate, ethoxylated pentaerythritol tetraacrylate, di-trimethylolpropane tetraacrylate, N,N'-m-phenylene dimaleimide, 4,4'-bismaleimido-diphenylmethane, 3,3'-bismaleimido-diphenylmethane, or a combination thereof. In a more preferred embodiment, the co-agent includes trimethylolpropane triacrylate, N,N'-m-phenylene dimaleimide, or a combination thereof.

In yet another embodiment, the curing system further includes a second, different co-agent present in an amount of about 0.1 percent to 10 percent by weight of the modified blend. In a preferred embodiment, the second co-agent includes syndiotactic 1,2-polybutadiene, atactic 1,2-polybutadiene, high vinyl solution styrene-butadiene elastomer, or mixtures thereof. In a more preferred embodiment, the syndiotactic 1,2-polybutadiene has a melting point of at least about 60° C.

In one embodiment, the modified blend includes about 10 percent to 70 percent by weight propylene resin, about 5 percent to 60 percent by weight ethylene/alpha-olefin/non-conjugated diene elastomer component and about 1 percent to 30 percent by weight bonding agent. In another embodiment, the free radical initiator includes at least one organic peroxide and the blend is at least essentially free of moisture sensitivity. In yet another embodiment, the modified blend further includes about 5 percent to 65 percent by weight of at least one extender oil. In yet a further embodiment, the modified blend further includes a filler component present in an amount of about 0.001 percent to 20 percent by weight.

In one embodiment, the ethylene/alpha-olefin/non-conjugated diene elastomer component includes ethylene/propylene/diene elastomer. In a preferred embodiment, the ethylene/alpha-olefin/non-conjugated diene elastomer component without oil has a Mooney viscosity [ML (1+4) @ 125° C.] of at least about 100. In another embodiment, the modified blend further includes one or more of organic and inorganic pigments, heat stabilizers, antioxidants, ultraviolet absorbers, photostabilizers, flame retardants, antiblocking agents, foaming agents, antistatic agents or antibacterial agents, or any combination thereof.

The invention also encompasses an article including any of the reactively modified blends above. Further, the invention encompasses a process for preparing a dynamically vulcanized thermoplastic elastomer composition by blending a mixture of a polypropylene resin, an ethylene/alpha-olefin/non-conjugated diene elastomer component, and a bonding agent at a temperature above the melting point of the polypropylene resin, adding a free radical initiator and a co-agent including multifunctional acrylates containing at least two acrylate groups, multifunctional maleimides containing at least two imide groups, or mixtures thereof, to form a blend, and then mixing and shearing the blend sufficiently at a temperature to effect crosslink formation wherein the elastomer has a gel content of at least about 97 percent and to provide the dynamically vulcanized thermoplastic elastomer composition that is adherent to polar materials. In a preferred embodiment, the elastomeric composition has an adhesion rating of 1 and a failure type that is cohesive.

The invention further encompasses a thermoplastic elastomer curing system that includes a free radical initiator including at least one organic peroxide, a co-agent including multifunctional acrylates containing at least two acrylate groups, multifunctional maleimides containing at least two imide groups, or mixtures thereof, wherein the curing system includes sufficient amounts of the free radical initiator and the co-agent, when combined with a polypropylene resin, an ethylene-containing material and a bonding agent, to form a reactively modified thermoplastic elastomer blend having a gel content of the modified elastomer of at least about 97 percent and to provide blends adherent to polar materials. In a preferred embodiment, the elastomeric blend has an adhesion rating of 1 and a failure type that is cohesive.

In another embodiment, the invention encompasses a thermoplastic elastomer-based reaction mixture including a propylene resin, an ethylene/alpha-olefin/non-conjugated diene elastomer component, and a bonding agent, and the thermoplastic elastomer curing system described above.

The invention also encompasses a vulcanizable mixture including a propylene resin, an ethylene/alpha-olefin/non-conjugated diene copolymeric elastomer component, a bonding agent, and a curing system including: a free radical initiator and a co-agent including one or more multifunctional acrylates containing at least two acrylate groups, multifunctional maleimides containing at least two imide groups, or mixtures thereof. It should be understood that each of the above embodiments and preferred embodiments applies to each of these aspects of the invention.

DETAILED DESCRIPTION OF THE PREFERRED EMBODIMENTS

In accordance with this invention, it has now been found that an adherent, thermoplastic elastomer ("TPE") composition of a reactively modified blend of a propylene resin, an ethylene/alpha-olefin/non-conjugated diene elastomer component, and a bonding agent may be dynamically vulcanized via a curing system containing a free radical initiator and a co-agent selected from the group consisting of multifunctional acrylates containing at least two acrylate groups, multifunctional maleimides containing at least two imide groups, or mixtures of both. The reactively modified TPE preferably has increased adherence to polar materials.

"Adhesion" (i.e., to adhere) is used herein to refer to the attraction between two different condensed phases of material while the two phases are in contact. Attractive forces may range in magnitude from strong chemical bonds (about 25 to 100 kcal/mol) to much weaker physical forces, known as van der Waals interactions. An adhesive joint, or adhesively bonded joint, is formed between two bodies (i.e., adherents, layers, films, substrates, or the like) which are held together by adhesion. One important characteristic of adhesion is that the two adherent materials must resist separation, and preferably are difficult to separate.

The two predominant mechanisms of failure in adhesively bonded joints tend to be adhesive failure and cohesive failure. Adhesive failure is the interfacial failure between the two adherent materials, indicating an undesirably weak boundary layer or insufficient adhesion between layers. Cohesive failure is the internal failure within one of the adhered materials, indicating that the maximum strength of the bonded materials is less than the strength of the adhesive strength between the two phases. Usually, the failure of adhesive joints is neither completely cohesive nor completely adhesive.

The propylene resin is generally present in amounts from about 10 to 70 percent by weight, preferably about 11 to 60 percent by weight, and more preferably about 12 to 55 percent by weight and includes one or more of the following: homopolymers of propylene, copolymers of at least 60 mole percent of propylene and at least one other $C_2$ to $C_{20}$ alpha-olefin, or mixtures thereof. Preferred alpha-olefins of such copolymers include ethylene, 1-butene, 1-pentene, 1-hexene, methyl-1-butenes, methyl-1-pentenes, 1-octene and 1-decene or combinations thereof. The propylene resin is typically substantially free, preferably entirely free, of any functionalization, as contrasted with the bonding agent of the invention.

The copolymer of propylene can include one or more random or block copolymers. Random copolymers of propylene and alpha-olefins, when used, generally include macromolecular chains in which the monomers are distributed statistically. The propylene content of these random copolymers is generally at least about 70 mole percent and preferably at least about 75 mole percent. The block copolymers can include distinct blocks of variable composition; each block including a homopolymer of propylene and at least one other of the above-mentioned alpha-olefins. Although any suitable copolymerization method is included within the scope of the invention, heterophasic copolymers with propylene blocks are generally obtained by polymerization in a number of consecutive stages in which the different blocks are prepared successively.

The melt flow rate (MFR) of the propylene polymer used in the present invention is preferably from about 0.01 to 200 g/10 minutes (load: 2.16 kg at 230° C., according to ASTM D-1238-01). Exemplary propylene homopolymers or copolymers are commercially available as PROFAX, ADFLEX AND HIFAX from Basell North America, Inc. of Wilmington, Del., as FORTILENE, ACCTUFF or ACCPRO from British Petroleum Chemicals of Houston, Tex., and as various types of polypropylene homopolymers and copolymers from ExxonMobil Chemicals Company of Houston, Tex., from Borealis A/S from Lydgby, Denmark, from Sunoco Chemicals of Pittsburgh, Pa., and from Dow Chemical Company of Midland, Mich.

The ethylene terpolymer elastomer component (ethylene/alpha-olefin/non-conjugated diene) is typically present in an amount from about 5 to 60 percent by weight, preferably about 6 to 55 percent and more preferably about 7 to 50 percent by weight (excluding oil) and is generally chosen from terpolymers containing from about 40 to 75 percent by weight ethylene, from about 20 to 60 percent by weight of a $C_3$ to $C_{20}$ alpha-olefin component, and from about 1 to 11 percent by weight of non-conjugated diene monomer. The alpha-olefin component includes one or more $C_3$ to $C_{20}$ alpha-olefins, with propylene, 1-butene, 1-hexene, and 1-octene preferred, and propylene being most preferred for use in the ethylene elastomer.

Examples of suitable non-conjugated diene monomer includes one or more straight chain, hydrocarbon di-olefin or cylcloalkenyl-substituted alkenes having from 6 to 15 carbon atoms, or combinations thereof. Specific preferred examples include one or more classes or species including: (a) straight chain acyclic dienes such as 1,4-hexadiene and 1,6-octadiene; (b) branched chain acyclic dienes such as 5-methyl-1,4-hexadiene; 3,7-dimethyl-1,6-octadiene; 3,7-dimethyl-1,7-octadiene; (c) single ring alicyclic dienes, such as 1,4-cyclohexadiene; 1,5-cyclooctadiene and 1,5-cyclododecadiene; (d) multi-ring alicyclic fused and bridged ring dienes such as tetrahydroindene; methyl-tetrahydroindene; dicyclopentadiene (DCPD); bicyclo-(2.2.1)-hepta-2,5-diene; alkenyl, alkylidene, cycloalkenyl and cycloalkylidene norbornene, such as 5-methylene-2-norbornene (MNB), 5-propenyl-2-norbornene, 5-isopropylidene-2-norbornene, 5-ethylidene-2-norbornene (ENB), 5-(4-cyclopentenyl)-2-norbornene, 5-cyclohexylidene-2-norbornene, and 5-vinyl-2-norbornene (VNB); (e) cycloalkenyl-substituted alkenes, such as allyl cyclohexene, vinyl cyclooctene, allyl cyclodecene, vinyl cyclododecene. Of the non-conjugated dienes typically used, the preferred dienes are dicyclopentadiene, 1,4-hexadiene, 5-methylene-2-norbornene, and 5-ethylidene-2-norbornene, or combinations thereof.

In another embodiment, one or more styrenic elastomers with up to about 50 mole percent styrene may be used in place of, or in addition to, the ethylene terpolymer elastomer(s) in forming the elastomer component phase of the invention. "Styrenic elastomer," as used herein, designates an elastomer having at least one block segment of a styrenic monomer in combination with an olefinic component that is hydrogenated or that contains at least some unsaturation (non-hydrogenated). Linear, radial, diblock, or triblock type styrenic elastomers can be used herein. The styrenic elastomer, if present, is preferably non-functionalized.

The styrenic portion of the elastomer, if present, is preferably a polymer of styrene and its analogs and homologs, or any combination thereof, including alpha-methylstyrene, and ring-substituted styrenes, particularly ring-methylated styrenes. The preferred styrenics are styrene and alpha-methylstyrene, with styrene being especially preferred. The olefinic component of the styrenic elastomer may be, e.g., ethylene, butadiene, isoprene, butylene, propylene, or combinations thereof. Preferred styrenic elastomers include styrene-butadiene, styrene-butadiene-styrene, styrene-isoprene, styrene-isoprene-styrene, styrene-ethylene/butylene, styrene-ethylene/butylene-styrene, styrene-ethylene/propylene, styrene-ethylene/propylene-styrene, styrene-ethylene/propylene-styrene-ethylene-propylene, styrene-butylene-butadiene-styrene, or combinations thereof.

The elastomer without any oil extension typically has a Mooney viscosity (ML 1+4, 125° C.), as measured by ASTM D-1646-00, of at least about 100. Elastomeric terpolymers of ethylene/propylene/diene (EPDM) are preferred. Exemplary elastomers are commercially available as NORDEL from DuPont Dow Elastomers LLC of Wilmington, Del., as VISTALON from ExxonMobil Chemicals of Houston, Tex., as DUTRAL from Polimeri Europa Americas of Houston, Tex., as BUNA EP from Bayer Corporation of Pittsburgh, Pa., as KELTAN from DSM Elastomers America of Baton Rouge, La., as ROYALENE from Crompton Corporation of Middlebury, Conn., as TUFTEC from Asahi America Inc. of Malden, Mass., or as KRATON from Kraton Polymers LLC of Houston, Tex.

The bonding agent used in the present invention promotes, or increases, adhesion when used in forming the thermoplastic vulcanizate. In contrast to bonding agents, adhesives and adhesive layers are applied separately by surface application (e.g., lamination) or liquid application. The bonding agent of the invention is included as part of the TPE vulcanizate blend during formation thereof. The bonding agent preferably includes one or more functionalized propylene homopolymers or copolymers, and is generally present in an amount sufficient to increase the adhesion of the reactively modified TPE vulcanizate. Preferably, the bonding agent is present in an amount from about 1 to 30 percent by weight, preferably about 2 to 20 percent by weight, and more preferably about 3 to 15 percent by weight.

The propylene resin of the bonding agent can be functionalized (i.e., grafted) with a graftable monomer by any technique known to one of ordinary skill in the art, such as that taught in U.S. Pat. No. 4,950,541, the disclosure of which is incorporated herein by express reference thereto. The graftable monomer bearing at least one functional group chosen from a carbonyl and an acid anhydride may be chosen, for example, from unsaturated monocarboxylic or dicarboxylic acids and derivatives thereof and unsaturated monocarboxylic or dicarboxylic acid anhydrides and derivatives thereof. As typical examples, the functional group may include: maleic acid, fumaric acid, itaconic acid, crotonic acid, succinic acid, cinnamic acid, citraconic acid, maleic anhydride, itaconic anhydride, crotonic anhydride, citraconic anhydride, and any combinations thereof. Preferably, maleic anhydride, itaconic anhydride, or combinations thereof are used. More preferably, the bonding agent includes a maleic anhydride grafted propylene homopolymer or copolymer containing less than about 100 parts per million (ppm) of free, residual maleic.

The bonding agent may be added to the thermoplastic elastomeric blend before or after vulcanization. Adding the functionalized polypropylene downstream after vulcanization or as a separate step after the TPV is formed is preferred. Exemplary functionalized propylene homopolymers or copolymers are commercially available as PRIEX from Solvay, S. A. of Brussels, Belgium, as POLYBOND from Crompton Corporation of Middlebury, Conn., and as EPOLENE from Eastman Chemical Company of Kingsport, Tenn.

The present invention has surprisingly and unexpectedly demonstrated that certain functionalized polymers are more effective as bonding agents for the successful adhesion of the thermoplastic vulcanizate to polar materials, i.e. certain materials increase adhesion more than others, and certain materials do not even create sufficient adherency to be referred to as adherent materials. Maleated styrene-ethylene-butylene-styrene (SEBS-MA), for example, is not as effective a bonding agent as the functionalized polypropylene used in the present invention. Thus, the bonding agent is preferably at least substantially free, or entirely free, of SEBS-MA. Moreover, adding the bonding agent of one or more functionalized polypropylene materials to a conventional TPV is insufficient for optimum results, indicating that the proper choice of elastomer curing system for the TPV is also essential for satisfactory adhesion.

The elastomer curing system contains a free radical initiator combined with at least one co-agent. The free radical initiator should be chosen so that a sufficient amount of radicals are generated to cause full curing of the elastomer during the mixing process. The free radical initiator is present in amounts from about 0.001 to 2 percent by weight, with about 0.01 to 1 percent by weight being preferable and about 0.03 to 0.3 percent by weight being most preferable. Typically, the free radical initiator may be one or more organic peroxides, organic azo compounds, or any mixtures thereof.

Free radical initiators useful for this invention, preferably one or more organic peroxides, should have a decomposition half-life of greater than about one hour at 120° C. Representative peroxides that are useful are peroxyketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)cyclohexane, 1,1-bis(t-butylperoxy)cyclododecane, 1,1-bis(t-butylperoxy)cyclohexane, 2,2-bis(t-butylperoxy)octane, n-butyl-4,4-bis(t-butylperoxy)butane, n-butyl-4,4-bis(t-butylperoxy)valerate, etc.; dialkyl peroxides such as di-t-butyl peroxide, dicumyl peroxide, t-butyl-cumyl peroxide, alpha,alpha'-bis(t-butylperoxy-m-isopropyl)benzene, alpha,alpha'-bis(t-butylperoxy) diisopropylbenzene, 2,5-dimethyl-2,5-bis(t-butylperoxy) hexane, 2,5-dimethyl-2,5-bis(t-butylperoxy)-hexyne-3, etc.; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide, m-tolyoyl peroxide, etc.; peroxyesters such as t-butyl peroxyacetate, t-butyl peroxyisobutyrate, t-butylperoxy-2-ethyl hexanoate, t-butyl peroxylaurylate, t-butyl peroxybenzoate, di-t-butyl peroxyisophthalate, 2,5-dimethyl-2,5-di(benzoylperoxy)hexane, t-butyl peroxymaleate, t-butyl peroxyisoproylcarbonate, cumyl peroxyoctate, etc.; hydroperoxides such as t-butyl hydroperoxide, cumene hydroperoxide, diisopropylbenzene hydroperoxide, 2,5-dimethylhexane-2,5-dihydroperoxide, 1,1,3,3-tetra-methylbutyl peroxide, etc; or any combination thereof. Among these compounds, dialkyl peroxides with a half life of greater than one hour at 120° C. are preferable. Half life is defined as the time required to reduce the original peroxide concentration by half.

The co-agent in the elastomer curing system is present in amounts from about 0.1 to 10 percent by weight, preferably from about 0.5 to 7 percent by weight, and most preferably from about 0.7 to 3 percent by weight, and may include one or more multifunctional acrylates containing at least two acrylate groups, multifunctional maleimides containing at least two imide groups, or mixtures thereof. Examples of multifunctional acrylates particularly useful in this invention are trimethylolpropane triacrylate (TMPTA), ethoxylated trimethylolpropane triacrylate, propoxylated trimethylolpropane triacrylate, propoxylated glyceryl triacrylate, pentaerythritol triacrylate, cyclohexane dimethanol diacrylate, pentaerythritol tetraacrylate, ethoxylated pentaerythritol tetraacrylate, and di-trimethylolpropane tetraacrylate. Examples of multifunctional imides which could also be used in this invention are phenylene-bis-maleimides such as N,N'-m-phenylene dimaleimide, as well as 4,4'-bismaleimido-diphenylmethane and 3,3'-bismaleimido-diphenylmethane. In one more preferred embodiment, the co-agent is a multifunctional acrylate, more preferably one which includes TMPTA.

Unexpectedly, it was found that the methacrylates such as trimethylolpropane trimethacrylate (TMPTMA) do not effectively improve the compression set and oil swell when used in conjunction with 1,2-polybutadiene as a co-agent in the dynamic vulcanization of EPDM in the presence of polypropylene. This result is in direct contrast to standard thermoset EPDM, where vulcanization of EPDM with TMPTMA/1,2-polybutadiene and a peroxide is well known to decrease compression set and oil swell. Such an anomaly demonstrates that, although the literature on the use of co-agents in thermoset rubbers may be used as a guide for a dynamically vulcanized system, significant differences and unpredictabilities may be encountered. Thus, in one embodiment, the co-agents are at least substantially free of TMPTMA or all methacrylates, and preferably entirely free of TMPTMA, or all methacrylates.

Additional co-agents may optionally be present in amounts up to about 10 percent by weight, preferably about 1 to 7 percent by weight and most preferably from about 2 to 6 percent by weight and may include a diene-containing polymer with a 1,2-vinyl content greater than 50 percent, including atactic 1,2-polybutadiene, syndiotactic 1,2-polybutadiene, high vinyl solution styrene-butadiene elastomers, or mixtures thereof. Atactic 1,2-polybutadiene, or atactic high vinyl polybutadiene, is typically a viscous liquid having a structure in which the side-chain vinyl groups are located randomly. The preparation of the atactic form generally involves lithium catalyzed polymerization using polar modifiers, such as chelating diamines, oxygenated ether compounds, acetals, and ketals and is described in, for example, U.S. Pat. No. 4,696,986, which is incorporated herein by express reference thereto. Any other suitable method of forming atactic 1,2-polybutadiene may be used. The atactic polybutadiene typically has a number average molecular weight (Mn) ranging from about 1,300 to 130,000 and is commercially available in both liquid and solid supported form.

Syndiotactic 1,2-polybutadiene ("PBD") is a semi-crystalline thermoplastic resin that has a stereoregular structure in which the side-chain vinyl groups are located alternately on the opposite sides in relation to the polymeric main chain. The 1,2-polymerization of the butadiene occurs in a head-to-tail fashion and generates a new chiral center. In the syndiotactic polymer, alternate chiral centers have the same configuration. "Semi-crystalline" is herein defined as less than about 90 percent crystallinity.

The syndiotactic PBD polymer may be prepared by any suitable means including by solution, emulsion, or suspension polymerization using a Ziegler-type catalyst. A variety of coordination catalyst systems such as cobalt-based systems, iron-based catalyst systems, molybdenum-based catalyst systems, and chromium-based catalyst systems can be used as described in U.S. Pat. No. 6,201,080, which is incorporated herein by express reference thereto.

The physical, mechanical, and rheological properties of the syndiotactic PBD form are greatly affected by its melting point, vinyl content, and degree of crystallinity. Melting points as high as 206° C. are possible, depending on the synthetic method used. To maximize the effectiveness in this invention, the syndiotactic content of the PBD polymer should be sufficiently high to provide a crystalline melting point of at least about 60° C., preferably greater than about 70° C. and less than about 205° C. The 1,2-vinyl content is greater than 50 percent, preferably greater than 75 percent. The degree of crystallinity of the syndiotactic polybutadiene is less than about 50 percent, more preferably from about 10 to 45 percent. The weight average molecular weight of preferred syndiotactic polybutadienes is typically greater than about 100,000. In this invention, syndiotactic polybutadiene has the advantages of being easier to handle and costing less than the atactic high vinyl polybutadiene.

"High vinyl solution styrene-butadiene" elastomers are formed by the copolymerization of a conjugated diolefin monomer, such as 1,3-butadiene, with a vinyl aromatic monomer, such as styrene. The preferred vinyl content of the high vinyl solution styrene-butadiene elastomer is preferably greater than about 40 percent, more preferably greater than about 50 percent. The solution polymerization process for making high vinyl styrene-butadiene is described in U.S. Pat. No. 6,140,434, which is hereby incorporated herein by express reference thereto.

The degree or extent of curing in a thermoplastic vulcanizate is dependent on a variety of factors, including processing time, amount of elastomer curative, and type of curative. A fully cured elastomeric component according to the invention allows the TPV blends to have improved physical properties, with less oil-swell, lower compression set, and higher tensile strength properties, as compared to blends in which the rubber is incompletely or partially cured.

One measure of the extent of cure of the elastomeric component (i.e., measure of crosslinking) is the gel content in the elastomer phase. If the elastomeric phase is partially cured, then only part of the rubber is insoluble in solvents, such as xylene or cyclohexane. If the elastomeric phase is fully cured, at least about 97 percent of the elastomer is insoluble. The improved thermoplastic vulcanizates of the invention are produced by vulcanizing the blends to the extent that at least about 97 percent of the contained EPDM rubber has gelled. This gel content means that the elastomeric phase of the composition contains no more than three percent by weight of rubber extractable in cyclohexane at 23° C., and preferably means that the elastomeric phase of the composition contains less than one percent by weight extractable in cyclohexane at 23° C. In general, the fewer extractables, the better the properties; still more preferable are cured elastomers having essentially no extractable rubber (e.g., less than 0.5 weight percent) in cyclohexane at 23° C. "Fully cured," as referred to herein, means that the degree of curing, in terms of gel content, is at least about 97 percent, preferably at least 99 percent, in cyclohexane at 23° C.

Gel content reported as percent gel is determined by the procedure of U.S. Pat. No. 3,203,937 and U.S. Pat. No. 4,948,840, which includes determining the amount of insoluble polymer by soaking a specimen of the composition for 48 hours in cyclohexane at 23° C. and weighing the dried residue, then making suitable corrections based upon knowledge of the composition. Thus, corrected initial and final weights are used by subtracting from the initial weight the weight of the components soluble in cyclohexane, other than the rubber, such as extender oils and other components soluble in cyclohexane. Any insoluble pigments, fillers, etc., are subtracted from both the initial and final weights.

Furthermore, the percent by weight of oil swell is an implicit measure of the degree of curing or crosslinking of the elastomer phase for different thermoplastic vulcanizate (TPV) products with the same extender oil and polypropylene contents. Low or partial crosslinking of elastomer yields higher oil swell values, whereas a thermoplastic elastomer with highly crosslinked dispersed elastomer will have a lower (i.e., more preferred) oil swell according to the present invention. Oil swell is measured according to test method ISO 1817 (1999), using test oil IRM903. Samples of the material compositions are immersed in the oil and held isothermally at 125° C. for 70 hours. Fresh IRM903 oil should be used for each test. This temperature and time criterion are used specifically for the automotive industry to ensure that TPV materials can be used in applications where the design temperature is about 100° C. Polyolefin-based thermoplastic elastomers with polyolefin elastomers that are not crosslinked, or only partially crosslinked, exhibit undesirably higher oil swell values, using the test conditions described herein, of 150 percent to over 1000 percent. It is only when the polyolefin elastomeric phase is near full crosslinking, with gel content at least about 97, that the oil swell value is typically less than about 100 percent by weight. The present invention provides a non-phenolic, resin-cured TPV with an oil swell, under the conditions herein described, that is preferably no more than about 90 percent by weight for a relatively harder TPV (at least 70 Shore A durometer or greater) and no more than about 100 percent by weight for a relatively softer TPV (no greater than 70 Shore A durometer).

Extender oils, or process oils, are often used to reduce any one or more of viscosity, hardness, modulus, and cost of an elastomeric composition. For the extension of most ethylene/alpha-olefin/non-conjugated diene elastomers, oils with a high degree of saturation are used. Saturated extender oils with paraffinic content greater than about 40 percent, when measured with method ASTM D-2140-97, are preferred. Paraffinic content greater than about 50 percent is more preferred. Viscosity of the extender oil is also important to ensure low volatility during the mixing process. Process oils which are useful for thermoplastic vulcanizate compositions typically have a kinematic viscosity at 40° C. greater than about 20 centi-Stokes using test method ASTM D-445-01. More preferably, the kinematic viscosity at 40° C. is greater than about 40 centi-Stokes. One of ordinary skill in the art of processing of elastomers will readily recognize the type and amount of oil that would be most beneficial for any given application according to the description herein. The extender oils, when used, are desirably present in an amount of about 4 to 65 percent by weight, preferably from about 5 to 60 percent by weight, and most preferably from about 10 to 55 percent by weight.

The present composition may further contain a filler component that typically includes one or more suitable filler materials. Typically, the filler component includes one or more inorganic fillers. Representative inorganic fillers for use in the present invention include, for example, calcium carbonate, magnesium carbonate, silica, carbon black, glass fibers, titanium oxide, clay, mica, talc, barium sulfate, magnesium hydroxide or aluminum hydroxide, or any combination thereof. Typically, the thermoplastic elastomers of this invention will contain optional filler, when present, in an amount from about 0.001 to 20 percent filler by weight. Other additives that can be included in the present invention include, for example, one or more organic and inorganic pigments, heat stabilizers, antioxidants, ultraviolet absorbers, photostabilizers, flame retardants, antiblocking agents, foaming agents, antistatic agents or antibacterial agents, each added in an amount sufficient to provide its desired effect (e.g., a heat stabilizer in an amount sufficient to stabilize the elastomer against heat).

Any suitable method can be used to prepare the blends of the invention. Melt blending is one preferred method for preparing the present invention. Techniques for melt blending of a polymer with additives of all types are known to those of ordinary skill the art and can typically be used with the present invention. Typically, in a melt blending operation useful with the present invention, the individual components of the blend are combined in a mechanical extruder or mixer, and then heated to a temperature sufficient to form a polymer melt and effect the reactive modification. The mechanical mixer can be a continuous or batch mixer. Examples of suitable continuous mixers include single screw extruders, intermeshing co-rotating twin screw extruders such as Coperion Werner & Pfleiderer ZSK extruders, counter-rotating twin screw extruders such as those manufactured by LEISTRITZ, and reciprocating single screw kneaders, such as BUSS co-kneaders. Examples of batch mixers are lateral 2-rotor mixers, such as BANBURY or BOLING mixers. The reactively modified blend may be mixed by any technique known to one of ordinary skill in the art, such as that taught in U.S. patent application Ser. No. 10/448,301, filed May 30, 2003, the disclosure of which is incorporated herein by express reference thereto. Preferably, substantially no further crosslinking, and more preferably, no further crosslinking, occurs after the blend is formed into an article.

The thermoplastic elastomer blend of the present invention forms a material that may be applied to a wide range of polar materials, preferably polar substrates. The polar material may be a metal such as aluminum, brass, chrome, copper, nickel, steel, stainless steel, titanium, or any combination or alloy thereof. Polar materials may also include one or more polar polymers containing one or more atoms in addition to hydrogen and carbon, such as nitrogen, oxygen, or one or more halogens. Preferably, the halogen includes fluorine. The blend of the present invention is particularly suitable for bonding to polar engineering resins with a glass transition temperature ($T_g$) or melting temperature ($T_m$) of at least about 150° C., preferably at least about 165° C., and more preferably from about 175° C. to 325° C. The polar polymers or engineering resins may be used singly or in combination, and are preferably selected from polyamides, polyimides, polycarbonates, polyesters, polyacetals, polystyrene, styrene acrylonitrile resins, acrylonitrile-butadiene-styrene (ABS) resins, polyphenylene oxide, homopolymers or copolymers of tetrafluoroethylene, vinyl fluoride, vinylidene fluoride, or chlorotrifluoroethylene, acrylics, methacrylics, aromatic ketones, or any combination thereof. Preferred polar polymers include polyamides. The more preferred polyamides are nylon-6; nylon-6,6; nylon-11; nylon-12; nylon-6,12; and mixtures or copolymers thereof. The thermoplastic elastomeric blend is preferably at least substantially free, or more preferably entirely free of the polar substrate component.

Thermoplastic elastomers from this invention are useful in automotive and other articles, such as gaskets, weatherseals, cup holders, and air bag covers. They can also be used in, for example, machine parts, electrical parts, cables, hoses, belts and toys. The present invention further includes articles including a substrate in combination with one or more layers which are formed, in whole or in part, from the present composition. The substrate can be covered in whole or in part with one or more layers. In one embodiment, a layer formed of or including the adherent, reactively modified TPE blend of the invention is preferably adjacent a portion of the substrate or surrounding the substrate, and any additional layers are not between the layer and substrate. Preferred articles include those having engineering substrates but which require a softer hand feel, such as power and hand tool covers and handles and the like. A TPV power grip application, for example, may be overmolded onto a polyamide housing, where the soft-touch and vibration-dampening properties of the TPV prove to be beneficial for the comfortable handling of the tool. These articles can be made by different plastic processing techniques, like injection overmolding, two-shot injection molding, insert molding, co-extrusion, blowmolding, and the like. The thermoplastic elastomeric blend may preferably be used as the base material for a glass run channel; a polyamide co-extruded therewith can provide low friction.

The term "substantially free," as used herein, means less than about 5 weight percent, preferably less than about 1 weight percent, and more preferably less than about 0.5 weight percent of the material referred to. In a preferred embodiment, it means less than about 0.1 weight percent. "Completely free" or "free" of a material refers to its complete absence except for any amount present as a trace impurity.

The term "essentially free," particularly as used herein with respect to moisture sensitivity of a material, means that the material has less than 0.2 weight percent actual moisture content, preferably less than about 0.17 weight percent. In one more preferred embodiment, the moisture content is below about 0.15 weight percent.

Unless indicated to the contrary, all weight percents are relative to the weight of the total composition.

The term "about," as used herein, should generally be understood to refer to both numbers in a range of numerals. Moreover, all numerical ranges herein should be understood to include each tenth of an integer within the range.

EXAMPLES

This invention is illustrated by the following examples that are merely for the purpose of illustration and are not to be regarded as limiting the scope of the invention or the manner in which it can be practiced.

Materials Used in the Examples

| | |
|---|---|
| TPV-1 | Peroxide-cured PP/EPDM thermoplastic vulcanizate; extender oil content 22 weight percent; curing system: 0.05 weight percent peroxide, 2 weight percent trimethylolpropane triacrylate |
| TPV-2 | Santoprene ™ 101-55 from Advanced Elastomer Systems |
| TPV-3 | Santoprene ™ 8281-55 from Advanced Elastomer Systems |
| TPV-4 | Santoprene ™ 8291-55PA from Advanced Elastomer Systems |
| PP-MA1 | Maleic anhydride grafted polypropylene, MA level = 0.5 weight percent |
| PP-MA2 | Maleic anhydride grafted polypropylene, MA level = 1 weight percent; MFR = 110 dg/min |
| PP-MA3 | Maleic anhydride grafted polypropylene, Acid value = 9 mg $CH_3ONa$/g polymer |
| PP-AA | Acrylic acid grafted polypropylene, AA level = 6 weight percent |
| SEBS-MA | Maleic anhydride grafted styrene-ethylene-butylene-styrene, Acid value = 10 mg $CH_3ONa$/g polymer |
| EPR-MA | Maleic anhydride grafted ethylene-propylene copolymer; MA level = 1.0 weight percent; MFR = 3 dg/min |

The following methods were used to determine the properties of the blends:

| | |
|---|---|
| 100% Modulus, MPa | Modulus at 100 percent elongation, with crosshead velocity of 500 mm/min, measured in mega Pascals, according to ISO 37 (1994). |
| UTS, MPa | Ultimate tensile strength, with crosshead velocity of 500 mm/min, measured in mega Pascals, according to ISO 37 (1994). |
| Ult. elong. % | Ultimate elongation percent, with crosshead velocity of 500 mm/min, according to ISO 37 (1994). |
| Hardness | Shore A durometer hardness measured at 15 seconds and at room temperature (23° C.), according to ISO 868 (1985). |
| Compression set, % | Compression set, at 70° C. or 125° C. for 70 hours, measured as a percentage, according to ISO 815 (1991). |
| Oil Swell, wt. % | Oil swell, at 125° C. or 70° C. for 70 hours using IRM903 oil, measured in percent by weight, according to ISO 1817 (1999). |
| Peel strength | Quantitative measurement of adhesion between two surfaces, measured in gm/cm at 180° angle by the method herein described. |
| Adhesion rating | The adhesion of the bondable TPV overmolded onto Nylon 6 sheet by the method herein described with ratings on a numeric scale from 1 to 4. |
| Failure type | The type of adhesion failure, rated from A to C: Type A: Adhesive/Interfacial (interfacial failure between the two substrates); Type B: Peels off (does not stick); Type C: Cohesive (internal failure in substrate) |

The thermoplastic vulcanizate of the present invention was molded onto a nylon substrate to evaluate the adhesion performance of a soft-touch TPV grip overmolded onto a polyamide housing. An extruded nylon-6 sheet with a thickness of approximately 0.6 to 1 mm was inserted in a 3 mm thick mold of dimensions 100×150 mm and a mold temperature of 90° C. The thermoplastic vulcanizate of the present invention was then injection molded over the nylon-6 sheet under suitable processing conditions. The nylon-6 sheet is typically not preheated before insert injection molding.

The peel strength of the test specimen was then measured as the force necessary to de-bond the two layers of the composite specimen. Peel strength specimens with dimensions of 12.7 mm×101.6 mm were cut from the above overmolded plaques. A small section of the overmolded TPV (about 15 mm in length) was peeled away and extended with a fiber reinforced adhesive, allowing ease of clamping of the test specimen on the Instron equipment. The adhesive reinforced TPV part was then clamped to the upper clamp, and the nylon part was clamped to the lower clamp. The bondable TPV and the nylon-6 layers were then pulled in opposite directions at a 180° peel angle. The force required to break the adhesion between the two layers was recorded in gm/cm and showed a direct correlation with the strength of the adhesive bond between the two layers. The peel strength is preferably at least about 650 g/cm, more preferably at least about 800 g/cm, and most preferably about 900 to 10,000 g/cm.

The adhesion between the bondable TPV of the invention and the nylon-6 test specimen was also rated on the following numeric scale:

| Adhesion rating | Description |
|---|---|
| 1 | TPV adheres strongly to the nylon-6 substrate and may not be peeled off without tearing the TPV |
| 2 | TPV adheres to the nylon-6 substrate but may be peeled off without tearing the TPV |
| 3 | TPV material sticks to the nylon-6 substrate but may be peeled off very easily |
| 4 | TPV does not stick to the nylon-6 substrate |

The thermoplastic elastomeric blend of the present invention, designated as TPV-1, was used in the following examples (Exs. 1-13). The composition included a polypropylene homopolymer and an EPDM elastomer cured via a peroxide cure as described above, with compression set at 125° C./70 hrs of 35%, Shore A hardness of 53, and oil swell at 125° C./70 hrs of 104%. TPV-1 was prepared in a Coperion Werner & Pfleiderer ZSK 70 mm co-rotating twin screw extruder with a length to diameter ratio (L/D) of 52. The solid materials were added in the first feed port while the liquid co-agent, if present, was injected in the second barrel. The extender oil, when used, was added downstream during the curing reaction. The extrusion temperature was 205° C., and the extruder speed was 400-450 rpm. Samples from the twin screw extruder were then injection molded into plaques approximately 2 mm thick from which ISO 37 (1994) Type C dumbbell specimens and ISO 34-1 (1994) 90° angle notched specimens were die cut and then measured for mechanical properties at test speeds of 500 mm/min with a gage length of 25 mm.

In Table I, TPV-1 was compounded with various functionalized polymers on a single screw Haake extruder at 205° C. Although the functionalized polymers improved adhesion to a certain extent, maleated propylenes (PP-MA) provided superior adhesion improvement compared to other bonding agents when overmolded onto a polyamide substrate. The Type C (cohesive) failure of Ex. 1 indicates that the bond strength at the interface between the two phases was stronger than the bonds within the phase and was therefore rated as a successful demonstration of the surprising and unexpected results of the composition of the present invention.

TABLE I

|  | Ex. 1 | Comp. 1 | Comp. 2 | Comp. 3 | Comp. 4 |
| --- | --- | --- | --- | --- | --- |
| Bonding agent, type | PP-MA1 | PP-AA | SEBS-MA | EPR-MA | None |
| Bonding agent, wt. % | 10 | 10 | 10 | 10 | — |
| Hardness, Shore A | 70 | 69 | 50 | 48 | 53 |
| UTS, MPa | 4.7 | 5.2 | 3.3 | 2.7 | 4.1 |
| Ult. elong, % | 272 | 333 | 322 | 276 | 328 |
| 100% Modulus, MPa | 3.4 | 3.3 | 1.8 | 1.6 | 2.0 |
| Adhesion rating | 1 | 3 | 2 | 2 | 4 |
| Failure type | Type C | Type A | Type A | Type A | Type B |

In Table II, various grades and amounts of PP-MA were compounded with TPV-1, which was then molded onto a nylon-6 substrate and evaluated as described above. Once again, cohesive failure is a desirable result.

TABLE II

|  | Ex. 2 | Ex. 3 | Ex. 4 | Ex. 5 | Ex. 6 | Ex. 7 | Ex. 8 |
| --- | --- | --- | --- | --- | --- | --- | --- |
| TPV-1, wt. % | 96 | 93 | 96 | 93 | 90 | 96.5 | 95 |
| PP-MA1, wt. % | 4 | 7 | — | — | — | — | — |
| PP-MA2, wt. % | — | — | 4 | 7 | 10 | — | — |
| PP-MA3, wt. % | — | — | — | — | — | 3.5 | 5 |
| Hardness, Shore A | 60 | 64 | 61 | 66 | 71 | 61 | 64 |
| UTS, MPa | 4.3 | 4.7 | 4.7 | 5.2 | — | 4.9 | 5.0 |
| Ult. elong, % | 287 | 301 | 288 | 291 | — | 287 | 305 |
| 100% Modulus, MPa | 2.7 | 3.1 | 2.9 | 3.4 | — | 2.9 | 3.1 |
| Adhesion rating | 1 | 1 | 1 | 1 | 1 | 1 | 1 |
| Failure type | Type C | Type C | Type C | Type C | Type C | Type C | Type C |

In Table III, Ex. 9 and Comp. Exs. 5-6 were compounded on a Haake single extruder at 205° C. The PP-MA was added in a separate step. Ex. 10 illustrates the results when PP-MA was added downstream during production of the TPV-1 composition. Comp. Exs. 5-6 used commercial grades of TPV, while Exs. 9-10, using a TPV of the present invention, demonstrated that a free radical curing system gives much better results than other types of TPV cures.

TABLE III

|  | Ex. 9 | Ex. 10 | Comp. 5 | Comp. 6 |
| --- | --- | --- | --- | --- |
| TPV-1, wt. % | 93 | 93 | — | — |
| TPV-2, wt. % | — | — | 93 | — |
| TPV-3, wt. % | — | — | — | 93 |
| PP-MA2, wt. % | 7 | 7 | 7 | 7 |
| Cure type | Free radical | Free radical | Phenolic | Hydrosilation |
| Adhesion rating | 1 | 1 | 2 | 2 |
| Failure type | Type C | Type C | Type A | Type A |
| Peel strength | 1473 | 1440 | 505 | 546 |

Exs. 11-13 in Table IV were compounded from 92.7 weight percent of TPV-1 and 7.5 weight percent of PP-MA1 in a single screw Haake extruder at 205° C. The results illustrate that the bondable TPV of this invention did not require drying before processing, while the commercial polyamide bondable TPV-4 must be dried before processing.

TABLE IV

|  | Ex. 11 | Ex. 12 | Ex. 13 | Comp. 7 |
| --- | --- | --- | --- | --- |
| Drying conditions | TPV-1 90° C. for 3-4 hours | TPV-1 No drying (0.5 wt. %) | TPV-1 Water added | TPV-4 No drying |
| Actual moisture content, wt. % | 0.08 | 0.10 | 0.17 | 0.20 |
| Adhesion rating | 1 | 1 | 1 | — |
| Failure type | Type C | Type C | Type C | — |
| Surface appearance | Excellent | Excellent | Fair | Severe polymer degradation could not be molded |

It is to be understood that the invention is not to be limited to the exact configuration as illustrated and described herein.

Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. An adherent, reactively modified thermoplastic elastomeric blend formed from the dynamic vulcanization of a material comprising a propylene resin, an ethylene/alpha-olefin/non-conjugated diene copolymeric elastomer component, and a bonding agent, in the presence of a curing system comprising:
   a free radical initiator;
   a first co-agent comprising one or more multifunctional acrylates containing at least two acrylate groups, multifunctional maleimides containing at least two imide groups, or mixtures thereof; and
   a second co-agent comprising syndiotactic 1,2-polybutadiene, atactic 1,2-polybutadiene, high vinyl solution styrene-butadiene elastomer, or mixtures thereof;
   wherein the free radical initiator and the first and second co-agent are collectively present in an amount sufficient to provide a gel content of the elastomeric blend of at least about 97 percent and to provide blends of the invention that are adherent with a minimum peel strength of at least about 650 g/cm to a polar material,
   wherein the elastomer component contains ethylene in an amount of about 40 to 75 percent by weight.

2. The modified blend of claim 1, wherein the bonding agent comprises a propylene homopolymer or copolymer functionalized with a graftable monomer selected from the group consisting of unsaturated monocarboxylic acids, unsaturated dicarboxylic acids, unsaturated monocarboxylic acid anhydrides, unsaturated dicarboxylic anhydrides, and combinations thereof, and wherein the elastomeric blend has an adhesion rating of 1 and a failure type that is cohesive.

3. The modified blend of claim 2, wherein the bonding agent comprises a maleic anhydride grafted propylene homopolymer or copolymer.

4. The modified blend of claim 1, wherein the free radical initiator is present in an amount of about 0.001 percent to 2 percent by weight of the modified blend.

5. The modified blend of claim 1, wherein the first co-agent is present in an amount of about 0.1 percent to 10 percent by weight of the modified blend.

6. The modified blend of claim 1, wherein the first co-agent comprises trimethylolpropane triacrylate, N,N'-m-phenylene dimaleimide, or a combination thereof.

7. The modified blend of claim 1, wherein the second co-agent is present in an amount of about 0.1 percent to 10 percent by weight of the modified blend.

8. The modified blend of claim 1, wherein the syndiotactic 1,2-polybutadiene has a melting point of at least about 60° C.

9. The modified blend of claim 1, wherein the modified blend comprises about 10 percent to 70 percent by weight propylene resin, about 5 percent to 60 percent by weight ethylene/alpha-olefin/non-conjugated diene elastomer component and about 1 percent to 30 percent by weight bonding agent.

10. The modified blend of claim 4, wherein the free radical initiator comprises at least one organic peroxide and the blend is at least essentially free of moisture sensitivity.

11. The modified blend of claim 1, further comprising at least one extender oil.

12. The modified blend of claim 1, further comprising a filler component present in an amount of about 0.001 percent to 20 percent by weight.

13. The modified blend of claim 1, wherein the ethylene/alpha-olefin/non-conjugated diene elastomer component comprises ethylene/propylene/diene elastomer.

14. The modified blend of claim 1, wherein the ethylene/alpha-olefin/non-conjugated diene elastomer component without oil has a Mooney viscosity [ML (1+4) @ 125° C.] of at least about 100.

15. The modified blend of claim 1, further comprising one or more of organic and inorganic pigments, heat stabilizers, antioxidants, ultraviolet absorbers, photostabilizers, flame retardants, antiblocking agents, foaming agents, antistatic agents or antibacterial agents, or any combination thereof.

16. An article comprising the reactively modified blend of claim 1.

17. A process for preparing a dynamically vulcanized thermoplastic elastomer composition which comprises:
   blending a mixture of a polypropylene resin, an ethylene/alpha-olefin/non-conjugated diene elastomer component, and a bonding agent at a temperature above the melting point of the polypropylene resin;
   adding a free radical initiator, a first co-agent comprising multifunctional acrylates containing at least two acrylate groups, multifunctional maleimides containing at least two imide groups, or mixtures thereof, and a second co-agent comprising syndiotactic 1,2-polybutadiene, atactic 1,2-polybutadiene, high vinyl solution styrene-butadiene elastomer, or mixtures thereof, to form a blend; and
   then mixing and shearing the blend sufficiently at a temperature to effect crosslink formation wherein the elastomer has a gel content of at least about 97 percent and to provide the dynamically vulcanized thermoplastic elastomer composition that is adherent to polar materials,
   wherein the elastomer component contains ethylene in an amount of about 40 to 75 percent by weight.

18. A vulcanizable mixture comprising a propylene resin, an ethylene/alpha-olefin/non-conjugated diene copolymeric elastomer component, a bonding agent, and a curing system comprising: a free radical initiator, a first co-agent comprising one or more multifunctional acrylates containing at least two acrylate groups, multifunctional maleimides containing at least two imide groups, or mixtures thereof, and a second co-agent comprising syndiotactic 1,2-polybutadiene, atactic 1,2-polybutadiene, high vinyl solution styrene-butadiene elastomer, or mixtures thereof, wherein the elastomer component contains ethylene in an amount of about 40 to 75 percent by weight.

19. The vulcanizable mixture of claim 18, wherein the multifunctional acrylate includes at least three acrylate groups.

20. The modified blend of claim 11, wherein the at least one extender oil is present in an amount of about 5 percent to 65 percent by weight.

21. An adherent, reactively modified thermoplastic elastomeric blend formed from the dynamic vulcanization of a material comprising a propylene resin, an ethylene/alpha-olefin/non-conjugated diene copolymeric elastomer component, and a bonding agent, in the presence of a curing system comprising:
   a free radical initiator present in an amount of about 0.001 percent to 2 percent by weight of the modified blend;
   a first co-agent that is present in an amount of about 0.1 percent to 10 percent by weight of the modified blend and that comprises one or more multifunctional acrylates containing at least two acrylate groups, multifunctional maleimides containing at least two imide groups, or mixtures thereof; and a second co-agent comprising syndiotactic 1,2-polybutadiene, atactic 1,2-polybutadiene, high vinyl solution styrene-butadiene elastomer, or mixtures thereof, wherein the free radical initiator and the first and second co-agent are collectively present in an amount sufficient to provide a gel content of the elastomeric blend of at least about 97 percent and to provide blends of the invention that are adherent with a minimum peel strength of at least about 650 g/cm to a polar material, wherein the elastomer component contains ethylene in an amount of about 40 to 75 percent by weight.

22. The modified blend of claim 1, wherein the first co-agent comprises trimethylolpropane triacrylate, ethoxylated trimethyloipropane triacrylate, propoxylated trimethylolpropane triacrylate, propoxylated glyceryl triacrylate, pentaerythritol triacrylate, cyclohexane dimethanol diacrylate, pentaerythritol tetraacrylate, ethoxylated pentaerythritol tetraacrylate, di-trimethylolpropane tetraacrylate, N,N'-m-phenylene dimaleimide, 4,4'-bismaleimido-diphenylmethane, 3,3'-bismaleimido-diphenylmethane, or a combination thereof.

23. The modified blend of claim 1, wherein the non-conjugated diene is present in an amount from about 1 to 11 percent by weight of the elastomer component.

24. The modified blend of claim 1, wherein the alpha-olefin is a $C_3$ to $C_{20}$ alpha-olefin that is present in an amount from about 20 to 60 percent by weight of the elastomer component.

25. The modified blend of claim 21, wherein the second co-agent is present in an amount from about 1 to 10 percent by weight, the vinyl content of the second co-agent is present in an amount of at least 50 percent, or both.

* * * * *